(12) United States Patent
Zurmuehl et al.

(10) Patent No.: US 8,429,549 B2
(45) Date of Patent: Apr. 23, 2013

(54) SYSTEM AND METHOD FOR AUTOMATED COLOR SCHEME TRANSFORMATION

(75) Inventors: Martin Zurmuehl, Muehlhausen (DE); Tim Back, Mannheim (DE)

(73) Assignee: SAP AG, Walldorf (DE)

( * ) Notice: Subject to any disclaimer, the term of this patent is extended or adjusted under 35 U.S.C. 154(b) by 832 days.

(21) Appl. No.: 12/494,849

(22) Filed: Jun. 30, 2009

(65) Prior Publication Data

US 2010/0333003 A1 Dec. 30, 2010

(51) Int. Cl.
*G06F 3/00* (2006.01)
*G06F 3/048* (2006.01)

(52) U.S. Cl.
USPC ............... 715/765; 715/744; 715/866

(58) Field of Classification Search ............ 715/744, 715/765, 866
See application file for complete search history.

(56) References Cited

U.S. PATENT DOCUMENTS

| 6,309,117 | B1 | 10/2001 | Bunce et al. |
| 2005/0129308 | A1 | 6/2005 | Comfort et al. |
| 2006/0061586 | A1 | 3/2006 | Brulle-Drews et al. |
| 2007/0115297 | A1 | 5/2007 | Hirose |
| 2009/0037844 | A1* | 2/2009 | Kim et al. .................. 715/815 |
| 2010/0110100 | A1* | 5/2010 | Anandasivam et al. ...... 345/593 |

FOREIGN PATENT DOCUMENTS

| EP | 0674430 A1 | 9/1995 |
| EP | 1207463 A2 | 5/2002 |

OTHER PUBLICATIONS

B. McKellar, "BSP In-Depth: Abap Look and Feel Service" SAP Network blog, Jun. 12, 2005, http://www.sdn.sap.com/irj/scn/weblogs;jsessionid=(J2EE3417500)ID1503322950DB0174174478 7727606976End?blog=ipub/wlg/650, visited Sep. 11, 2009.
Extended European Search Report, dated Jan. 7, 2011, from related European Patent Application No. 10006470.8-2218.

* cited by examiner

*Primary Examiner* — Weilun Lo
*Assistant Examiner* — Truc Chuong
(74) *Attorney, Agent, or Firm* — Kenyon & Kenyon LLP

(57) ABSTRACT

Embodiments of the present invention provide a system, computer-readable medium and a method for transforming a color scheme. A processor is configured to retrieve from storage data including content elements defining a user interface screen in response to a user selection of a source color and a replacement color. For each content element of the user interface screen, a color of the content element is compared the source color. Based on the comparison, if the color of the content element falls within a predetermined threshold distance of the source color along a color palette, the color of the content element can be converting to the replacement color. After the processing of the content elements, the user interface is displayed on a display device, including the converted color element(s).

8 Claims, 2 Drawing Sheets

SYSTEM AND METHOD FOR AUTOMATED COLOR SCHEME TRANSFORMATION

BACKGROUND

The present invention relates to techniques for modifying user interfaces of computer programs autonomously to change the look and feel of the user interfaces.

Modern businesses often maintain computer networks on which a variety of application programs execute. The businesses often create a brand presence which includes stylized logos and a recognizable color scheme. These businesses often attempt to impose their color scheme to the user interfaces of the applications executing on their networks. Since the businesses may not author the applications that run on their networks, it can be a difficult undertaking to alter the color scheme of the computer application after it has been installed at the user location.

Color transformation schemes are well known. Typically, they involve a selection of a discrete set of reference colors and identification of other colors that will replace them. However, the implementations of user controls and other mechanisms often require a number of input operations, are tedious to use, and require frequent repetition of steps to make even the slightest transformations to the color scheme of a computer application. The inventors recognized a need for a more efficient automated color transformation method and system.

DETAILED DESCRIPTION

Embodiments of the present invention provide a computer implemented method for transforming colors of a predefined user interface. The method may operate on a source color that is selected by a user from a color palette and also on a replacement color designated by a user. When a new user interface screen is retrieved from memory and prior to its display, the method may review content of the user interface and determine, for each content element therein, whether the color of the content element falls within a predetermined threshold distance of the selected source color on the color palette. If so, the content element is converted from its original color to the replacement color. Once the entire user interface is processed and conversion operations are completed, it may be rendered on a display device.

An alternative embodiment of the present invention may convert content elements in a graduated manner. According to the alternative embodiment, if the color of a content element falls within a predetermined distance of the source color, the content element's color may be converted. The method may determine a distance vector separating the content element's color from the source color along the color palette. The content element's color may be converted to a new color which is separated from the replacement color by the same distance vector. Once the entire user interface is processed and conversion operations are completed, it may be rendered on a display device.

An embodiment of the present invention provides a system for transforming a color scheme of content elements to be presented in a user interface. The exemplary embodiment includes a client computer and a server. A display device is connected to the client computer, and the server includes a processor. The processor is configured to execute computer program instructions to implement the above described methods.

Another embodiment of the present invention provides a system for transforming a color scheme of content elements to be presented in a user interface. The exemplary embodiment includes a client computer, a display device and an input device that are connected to the client computer, and a server that provides content elements to the client computer. The client computer includes a processor. The processor is configured to execute computer program instructions to implement the above described method.

An embodiment of the present invention provides for a machine-readable medium embodied with computer program instructions that cause a processor to execute the computer program instructions to perform the functions of execute computer program instructions to implement the functions of the above described method.

Figure 1:
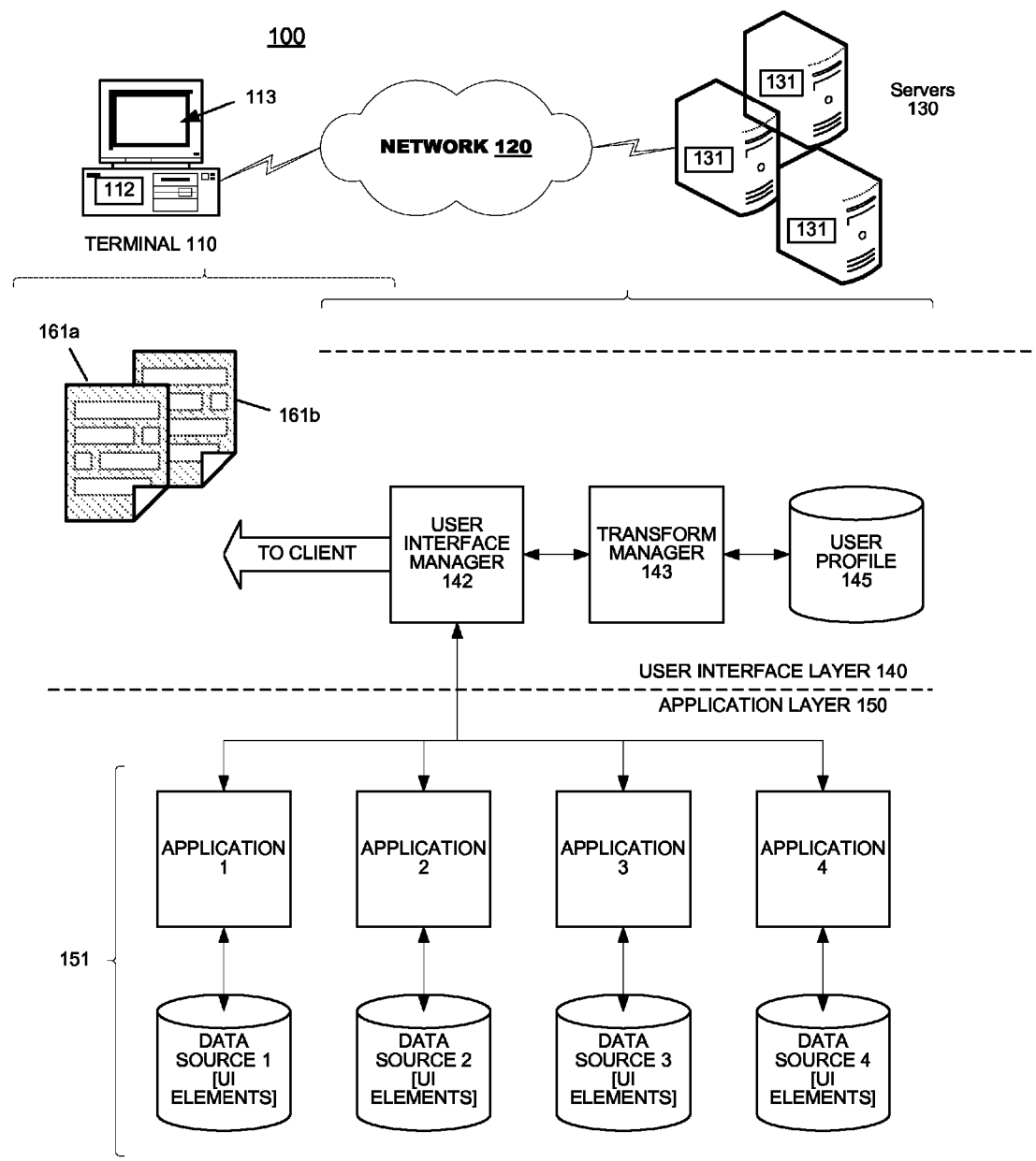
FIG. 1. illustrates an exemplary system for implementing a color transformation application according to an embodiment of the present invention.

FIG. 1 illustrates a system for implementing a color transformation scheme according to an embodiment of the present invention. Computer system 100 may include terminal(s) 110, network 120 and servers 130. Terminals 110 can be client computers at a plurality of locations coupled to the network 120. The terminals 110 can include processors 112, machine-readable data storage 111, e.g., databases, read only memory, random access memory or other computer-readable data storage devices, and display devices 113. The processor 112 can execute a browser application or other user interface application on the display device. The machine-readable data storage 111 can store computer program instructions executable by a processor 112. The machine-readable storage media 111 can include hard disks, magnetic tapes, RAID, computer discs, such as CDs and DVDs, flash memory or other suitable storage media. The terminals 110 can be a desktop computer, a laptop computer, a netbook computer, a personal digital assistant, a cellular device or a web-enabled wireless device.

The network 120 can be any form of network, such as the Internet, a proprietary network, a wide area network, a local area network, a metropolitan area network, a wired network, a wireless network, a cellular network, a telephone network, or any combination thereof.

Servers 130 can include processors 131 coupled to databases or other machine-readable storage media, such as disks, magnetic tapes, RAID or other suitable storage media. The servers 130 can perform functions commonly performed by servers.

A server 130 or a client terminal 110 can have a variety of software layers, such as a user interface layer 140 and an application layer 150, and others. The variety of software layers can be hosted on the server 130, the client terminal 110 (as shown in phantom), or a combination of both.

The user interface layer 140 can include a user interface manager 142, a transform manager 143, and a user profile 145. The user interface layer 140 can make the resources in the application layer 150 accessible from either servers 130 or from machine-readable media 111 requested by the client 110. The user interface layer 140 can control the interaction between the client 110 and the applications executing on the servers 130 or the client 110 as made available by the application layer 150.

The user interface manager 142 can facilitate communication between the client terminal 110, the network 120, and the servers 130. The user interface manager 142 can call different computer software resources from the servers 130 or machine-readable storage 111 based on the requests received from the client 110. For example, the user interface manager 142 can call the transform manager 143. The transform manager 143 can be a computer service that provides color transformation functions to the user interface manager 142. Optionally, the transform manager 142 can access a user profile related to the color transformation/conversion function specific to a user of the client 110 from a data storage device. The color transformation/conversion functions of the transform manager 143 and the user profile 145 will be described in more detail with reference to FIG. 2.

The application layer 150 can have a plurality of computer applications and associated data sources 151. The plurality of computer applications can access the associated data sources, which may or may not be located in a single data storage or a plurality of data storage devices, to provide user interface content elements for presentation on a client terminal 110. The computer applications can be any type of computer application, such as an enterprise relationship management application, supplier relationship management application, or a customer relationship management application, that presents data on a display device. The user interface content elements (UI elements) can form data presentations 161a and 161b when presented on a display device. For example, the data presentations 161a and 161b can be displayed as banners, logos, borders, pictures, graphics, animations, documents, charts, graphs, maps or any other form of data presentation, when the content elements are rendered.

The operation of the above described elements to provide a color scheme transformation/conversion will now be described with reference to FIG. 2.

Figure 2:
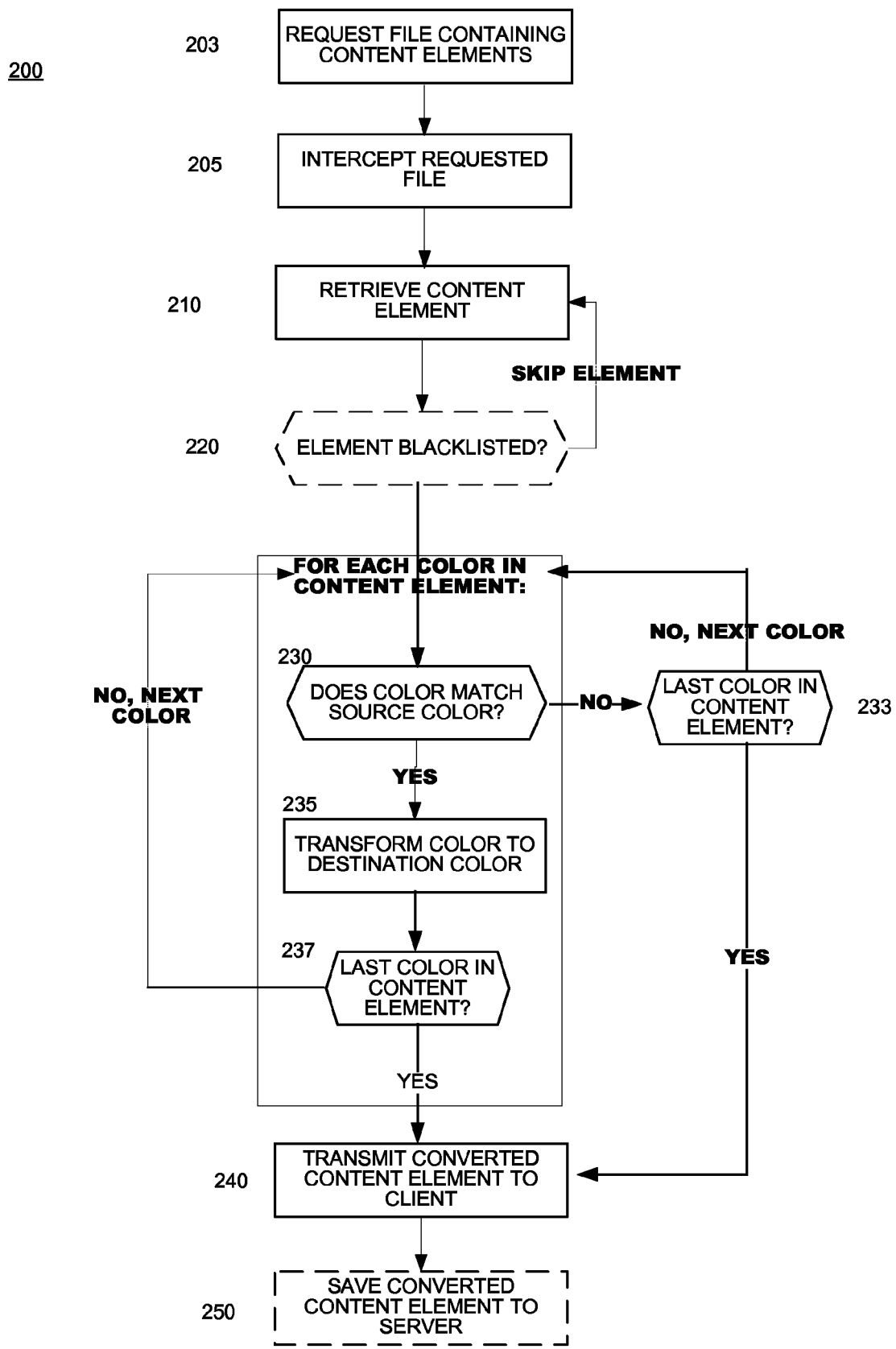
FIG. 2 illustrates an exemplary flowchart of a method according to an embodiment of the present invention.

FIG. 2 illustrates an exemplary flowchart of a method according to an embodiment of the present invention. The exemplary process 200 for transforming a color scheme of a browser user interface presented on a client display device will now be described in more detail. Colors can be represented by numerical values, such as binary values, alphanumerical, such as orange or hexadecimal values, a symbol, a combination of these, or any other representation of a color. In this application, the term "colors" refers to these representations.

A user interface can be presented in a browser window. The browser window can be formed from a number of content elements that contain colors. These colored content elements can simply be textual graphics or pictures (e.g., icons, photographs, animations or other colored identifiers) have a variety of file formats such as GIF, TIFF, BMP and .png), cascaded style sheets, HTML or other files. Portions of the browser fields are specified by style sheets. The style sheets can be analyzed, for example, to identify whether a portion of the user interface is assigned a particular color, and will also identify portions of the user interface that has been assigned to display a picture. In the style sheet, the location of a picture can be represented by a uniform resource locator (URL). When the browser is building the user interface, it will use the URL from the style sheet to fetch the picture for rendering in the user interface. Therefore, a browser may process a number of different file types when rendering the user interface.

The color transformation process 200 involves a client, such as client terminal 110 of FIG. 1, making a request (Step 203) that will be handled by a user interface manager that can be either in the client terminal or a server, such as server 140. The request can be for a computer application 151, such as a customer relationship management computer application, and/or for data, such a document, supported by a computer application.

In response to the request from a client, a file can be retrieved, for example, by the user interface manager 142, from an application or data source. The retrieved file can be used for rendering a user interface by a browser to access a computer application. The user interface for the computer application 151 can be formed from content elements that can be stored in a file, such as .GIF, TIFF, JPEG, .BMP and the like. These file types can be stored in a cascading style sheet within the HTML page that is to be rendered by the user interface. The style sheet can include images, such as icons or photographs and the like. The file format of the images determines the where in the file a color table containing values colors will be stored. Access to the color table is obtained by following the conventions of the file format. Once the file is loaded and opened, the color table is analyzed for the source color.

The requested computer application and/or the data typically will be returned to a browser running on the client, and presented in a user interface on a display device of the client. However, prior to being sent to the browser for generating the user interface, the file is intercepted or diverted, at step 205, for example, by the user interface module 142 or the transform manager 143, from being directly sent to a browser and presented on the display device of a client.

The intercepted file is analyzed by the transformation manager 143. At step 210, the content elements in the requested file can be analyzed. A content element can be a direct reference to a source color in the retrieved file (i.e., black or gold), or can be an indirect reference, such as a URL, to a secondary file location. The secondary files identified by the URL can be of a specific type, such as a GIF, TIFF, or JPEG. The file from the URL location is retrieved, for example, by the transform manager 143, the content elements in the file can be analyzed to determine if it directly refers to colors or to reference files that may contain colors. The retrieved file, such as a style sheet, may refer directly to a color, or may have a URL to identify the location of a secondary file, or contain a combination of direct references to colors and additional secondary files. The transform manager 143 can determine the type of the secondary file, e.g., GIF, TIFF, or JPEG, specified in the URLs, and based on the file type, knows the location of color data in the file structure. The color data can typically be found in a color table configured according the specification for the file type. The transform manager 143 can access either directly the retrieved content element, or when the content element is a secondary file, the color data information in a color table.

Upon obtaining the color data of the content element, the color data can be further analyzed, for example, by the transform manager 143. Using a look-up table or a similar mechanism, the color data can be compared to blacklisted colors. (Step 220). Blacklisted colors are colors, or combinations and arrangements of colors that are not permitted to be transformed. For example, a user may not want the Flag of The United States, or a company logo, such as the SAP logo, to be converted, and then the content element containing the arrangement and combination of colors, or an identifier of the Flag of The United States can be added to the blacklist look-up table.

If the content element is blacklisted, or not permitted to be converted (transformed), the content element is skipped. The process 200 returns to step 210, where the next content element is retrieved, and the analysis of whether the content element is permitted to be converted can be repeated.

However, if the content element is not blacklisted, then the process proceeds to step 230.

At step 230, a first of each color, that is permitted to be transformed, in a content element is reviewed to determine if it is a source color which is to be transformed to a replacement color. The replacement colors can be selected by a user prior to step 203 from a color palette that was previously presented to a user. Or the replacement colors can be selected from a database, such as user profiles 145, whenever a file is requested by a user. If the color does not match the source color, it is determined at step 233 whether this is the last color in the content element. If it is not the last color in the content element, the next color of the content element is examined. If it is the last color, the process moves to block 240.

If the color matches the source color, the color is transformed to the replacement color at step 235. The values of the transformed colors can be stored back in the color table or into the content element. The process 200 checks at 237 whether this is the last color in the content element. If it is not the last color, the next color is analyzed at step 230, and the above steps are repeated for the next color in the content element. If it is the last color, the process 200 proceeds to step 240.

Once the color has been transformed from the source color to the replacement color, the transformed colors, i.e. color values, can be stored in the color table of the content element, or the style sheet settings of the content element are changed to indicate the transformed color, the converted content element containing the transformed color is sent to the client for rendering by a browser, step 240, or similar user interface. The transformed content element in the file can be stored in the browser cache for later reuse.

Optionally, after the transformation of the colors, the files containing the transformed content elements can be stored in the user profile database 145 for future use and/or reference.

A user can select automatic transformation of the color scheme in four different scenarios: a single source color transformation, a single source color with a threshold transformation, multiple source color transformations, and multiple source colors with a threshold transformation. The four scenarios range in complexity from the simplest, the single source color, to the more complex, multiple source colors with a threshold.

The mathematics associated with performing the color transformation will now be described in more detail. In the single source color transformation, the user can pick a single color from the source color scheme that has a plurality of source colors. After selecting the source color, the user using a color palette or some other input control can select a target replacement color to which the selected source color will be transformed. All source colors will also be transformed based on the selected target replacement color. In the single source color transformation, the selected source color is transformed directly to the selected target replacement color. Similarly, all other colors of the source color scheme should be transformed to a representative target replacement color. Using a distance formulation, source colors that are further away in the color space from the selected target replacement color are not transformed so much that the colors are either too dark or too bright. For example, the transformation can be performed based on the color space HSL (Hue, Saturation and Lightness) as is well-known in the art for its computational ease. Of course, the HSV or any other color space can be used. In the HSL color space, the hue H starts at approximately the color red, which is equated to a value of 0 degrees, and passes 360 degrees through the colors orange, yellow, green, blue and purple to return the color red at 0 degrees. So hue H can be given a value between 0 and 360, while saturation S and lightness L are in the range between 0 and 1.

A suitable transformation $Trans(S_B, T_B, S_X) \rightarrow T_X$ is defined as follow:

$Delta\_H := H\_T_B - H\_S_B$ —The difference in hue between the source and the target replacement color.

$Delta\_S := S\_T_B - S\_S_B$ —The difference in saturation between the source and the target replacement color.

$Delta\_L := L\_T_B - L\_S_B$ —The difference in lightness between the source and the target replacement color.

The hue of the target replacement color obtained by transforming the color is:

$H\_T_X := (H\_S_X + Delta\_H)$ modulo 360.

The saturation of the target replacement color obtained by transforming the color is:

$S\_T_X := S\_S_X + \text{buffer}(S\_S_X, Delta\_S, S\_S_B)$— where If $S\_T_X > 1$ then $S\_T_X := 1$ elseif $S\_T_X < 0$ then $S\_T_X := 0$.

The lightness of the target replacement color obtained by transforming the color is:

$L\_T_X := L\_S_X + \text{buffer}(L\_S_X, Delta\_L, L\_S_B)$:

wherein: If $L\_T_X > 1$, then $L\_T_X := 1$ elseif $L\_T_X < 0$, then $L\_T_X := 0$.

Where in all of the above, buffer $(x,a,b) := $ if $x < a$ then $f(x,a,b)$ else $g(x,a,b)$ with lightness and saturation values calculated using:

$f(x,a,b) := (\sin(x*pi/a - pi/2) + 1)*b/2$ $g(x,a,b) := (\sin((x-a)*pi/(1-a) + pi/2) + 1)*b/2$, where x is the respective hue saturation or lightness value of the source base color, a is the respective hue, saturation or lightness of the source base color, and b is the difference in the respective hue, saturation or lightness between a source color and the selected source base color.

The buffer (x,a,b) prevents lightness L and saturation S from extending outside the range of 0 to 1. If lightness L and saturation S extend outside the range of 0 to 1, information can be lost, i.e., the colors will be either too dark or too light. The buffer allows the shift of dark or light colors to be reduces so these dark and light colors are not transformed to be either darker or lighter.

Color changes according to the second scenario, i.e., a single source color with threshold, are performed using to the above-described single source color transformation process. However, in this second scenario, a user selects a single source color from the source colors scheme, a target color and a threshold. The threshold can define a sphere around the selected source color. For example, the selected source color can be the center of the sphere and the threshold can be the radius. Of course, the threshold can be defined differently. Colors inside the sphere and on the sphere (i.e., at the threshold) will be transformed according to the above process. Colors outside the sphere will not be transformed, and will be identical as they appear in the source color scheme after the transformation.

The multiple source colors are selected by the user from the source color scheme, and are defined by the user to correspond to a selected source color in the target color scheme. The selected multiple source colors are transformed to the target colors using to the process for the single color scenario. The other colors B (i.e., the colors not selected as source colors in the source color scheme) of the content elements in the retrieved file must be mapped to the target color scheme. This is done on a color-by-color basis for all colors, not just the colors that match the source color, in a content element, as it is reviewed in step 230 above. When this third scenario is performed, the response in step 230 will always be "YES", and proceed to step 235. The distance from the color B of the content element to each of the selected source colors in the source color scheme is computed. The selected source color in the source color scheme that is a minimum distance from the color B of the content element is the selected source color that will be used in transformation of the color B of the content element. These other colors B are transformed based on the minimum distance from a selected source color and the corresponding selected color in the target color scheme. In other words, if the selected source colors are D and J, and they are selected to be transformed into P and Q, respectively, in the target color scheme, and a color B has a minimum distance to D as compared to J, then the color B will be transformed to the color P in the target color scheme. The transformations are also performed according to the single source color transformation.

As for the fourth scenario involving multiple source colors and a threshold, it is similar to the second scenario with respect to the threshold creating a sphere around the source color. The color transformation is performed using process of the above-described single source color transformation. In addition to the selecting multiple source colors, the user selects a threshold for each source color. To transform an arbitrary color X that is not one of the selected multiple source colors, the distance from X is computed to each of the multiple selected source colors. If X is outside the sphere defined by the threshold of the source color, the distance is considered infinite. If X is outside of all spheres of all source colors, then X remains unchanged. The source color with the minimal distance to X is the matching source color to choose for the transformation of X. The color X would be transformed using the single source color transformation of this source color and the corresponding color for the target color scheme.

Software modules including program instructions can be stored or embodied on machine-readable media such as discs, including CD and DVD, flash memory, hard drives including magnetic and optical drives, or any other suitable computer readable media. The software language used to write the software modules can be any language suitable for implementing the described exemplary embodiments, and such languages are known to those of skill in the art.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A user interface conversion method, comprising:
responsive to a user selection of a source color and a replacement color, retrieving from storage data including content elements defining a user interface screen;
for each content element of the user interface screen, comparing a color of the content element to the source color;
if the color of the content element falls within a predetermined threshold distance of the source color along a color palette, converting the color of the content element to the replacement color;
following processing of the content elements, displaying the user interface on a display device, including the converted color element(s);
storing a converted user interface to storage; and
prior to the comparing, determining whether the user interface has been processed by a prior iteration of the method,
wherein, on a second iteration of the method, the processing of content elements is not repeated.

2. A user interface conversion method, comprising:
responsive to a user selection of a source color and a replacement color, retrieving from storage data including content elements defining a user interface screen;
for each content element of the user interface screen, comparing a color of the content element to the source color;
if the color of the content element falls within a predetermined threshold distance of the source color along a color palette, converting the color of the content element to the replacement color;
following processing of the content elements, displaying the user interface on a display device, including the converted color element(s);
comparing attributes of each retrieved content element to a look-up table of attributes of content elements that are not permitted to be converted; and
if attributes of the retrieved content elements are found in the look-up table, skipping the conversion of the retrieved content element, and comparing the attributes of the next content element retrieved from the data storage.

3. A user interface conversion method, comprising:
responsive to a user selection of a source color and a replacement color, retrieving from storage data defining a user interface screen;
for each content element of the user interface, comparing a color of the content element to the source color;
if the color of the content element falls within a predetermined threshold distance of the source color along a color palette, converting the color of the content element to the replacement color;
determining a distance vector separating the content element's color from the source color along the color palette;
converting the color of the content element to a new color based on the replacement color and distance vector;
following processing of the content elements, displaying the user interface on a display device, including the converted color element(s);
storing a converted user interface to storage; and
prior to the comparing, determining whether the user interface has been processed by a prior iteration of the method, wherein, on a second iteration of the method, the processing of content elements is not repeated.

4. A user interface conversion method, comprising:
responsive to a user selection of a source color and a replacement color, retrieving from storage data defining a user interface screen;
for each content element of the user interface, comparing a color of the content element to the source color;
if the color of the content element falls within a predetermined threshold distance of the source color along a color palette, converting the color of the content element to the replacement color;
determining a distance vector separating the content element's color from the source color along the color palette;
converting the color of the content element to a new color based on the replacement color and distance vector;
following processing of the content elements, displaying the user interface on a display device, including the converted color element(s);
comparing attributes of each retrieved content element to a look-up table of attributes of content elements that are not permitted to be converted; and
if attributes of the retrieved content elements are found in the look-up table, skipping the conversion of the retrieved content element, and comparing the attributes of the next content element retrieved from the data storage;

otherwise, performing the comparing of a color of the content element to the source color.

5. A system for transforming a color scheme of a user interface, comprising:
 a server that provides a user interface screen to the client computer, wherein the user interface screen is defined by content elements;
 a client computer including a display device and an input device connected to the client computer, the client computer comprising a processor configured to:
  in response to a user selection of a source color and a replacement color, retrieve from storage data including content elements defining a user interface screen,
  for each content element of the user interface screen, compare a color of the content element to the source color,
  if the color of the content element falls within a predetermined threshold distance of the source color along a color palette, convert the color of the content element to the replacement color,
  following processing of the content elements, display the user interface on a display device, including the converted color element(s), and
  prior to the comparing, determine whether the user interface has been processed by a prior iteration,
  wherein, on a second iteration, the processing of content elements is not repeated; and
 a data storage device that stores a converted user interface.

6. A system for transforming a color scheme of a user interface, comprising:
 a server that provides a user interface screen to the client computer, wherein the user interface screen is defined by content elements;
 a client computer including a display device and an input device connected to the client computer, the client computer comprising a processor configured to:
  in response to a user selection of a source color and a replacement color, retrieve from storage data including content elements defining a user interface screen,
  for each content element of the user interface screen, compare a color of the content element to the source color,
  if the color of the content element falls within a predetermined threshold distance of the source color along a color palette, convert the color of the content element to the replacement color,
  following processing of the content elements, display the user interface on a display device, including the converted color element(s),
  compare attributes of each retrieved content element to a look-up table of attributes of content elements that are not permitted to be converted, and
  if attributes of the retrieved content elements are found in the look-up table, skip the conversion of the retrieved content element, and compare the attributes of the next content element retrieved from the data storage;
  otherwise, perform the comparing of a color of the content element to the source color.

7. A non-transitory machine-readable medium embodied with program instructions for causing a processor to execute the program instructions, the program instructions for transforming a color scheme of a user interface, comprising:
 responsive to a user selection of a source color and a replacement color, retrieving from storage data including content elements defining a user interface screen;
 for each content element of the user interface screen, comparing a color of the content element to the source color;
 if the color of the content element falls within a predetermined threshold distance of the source color along a color palette, converting the color of the content element to the replacement color;
 following processing of the content elements, displaying the user interface on a display device, including the converted color element(s);
 storing a converted user interface to storage; and
 prior to the comparing, determining whether the user interface has been processed by a prior iteration, wherein, on a second iteration, the processing of content elements is not repeated.

8. A non-transitory machine-readable medium embodied with program instructions for causing a processor to execute the program instructions, the program instructions for transforming a color scheme of a user interface, comprising:
 responsive to a user selection of a source color and a replacement color, retrieving from storage data including content elements defining a user interface screen;
 for each content element of the user interface screen, comparing a color of the content element to the source color;
 if the color of the content element falls within a predetermined threshold distance of the source color along a color palette, converting the color of the content element to the replacement color;
 following processing of the content elements, displaying the user interface on a display device, including the converted color element(s);
 comparing attributes of each retrieved content element to a look-up table of attributes of content elements that are not permitted to be converted; and
 if attributes of the retrieved content elements are found in the look-up table, skipping the conversion of the retrieved content element, and comparing the attributes of the next content element retrieved from the data storage.

* * * * *